US012560123B2

(12) United States Patent
Kannan et al.

(10) Patent No.: US 12,560,123 B2
(45) Date of Patent: Feb. 24, 2026

(54) ARCUATE FUEL GALLERY FOR TURBINE ENGINE FUEL NOZZLE

(71) Applicant: Pratt & Whitney Canada Corp., Longueuil (CA)

(72) Inventors: Jayaprakash Kannan, North York (CA); Sri Sreekanth, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 3 days.

(21) Appl. No.: 18/224,951

(22) Filed: Jul. 21, 2023

(65) Prior Publication Data

US 2025/0027450 A1 Jan. 23, 2025

(51) Int. Cl.
| | |
|---|---|
| *F02C 7/22* | (2006.01) |
| *F23R 3/28* | (2006.01) |

(52) U.S. Cl.
CPC ................ *F02C 7/22* (2013.01); *F23R 3/283* (2013.01); *F23R 2900/00004* (2013.01)

(58) Field of Classification Search
CPC .. F23R 3/283; F23R 3/286; F23R 3/28; F02C 7/222; F05D 2240/35; F02M 61/165; F02M 2200/27; B05B 1/14; B05B 1/18; B05B 1/185
See application file for complete search history.

(56) References Cited

U.S. PATENT DOCUMENTS

| | | | | |
|---|---|---|---|---|
| 3,102,392 A | * | 9/1963 | Bauger | F23R 3/20 60/765 |
| 6,082,113 A | | 7/2000 | Prociw | |

| | | | |
|---|---|---|---|
| 6,289,676 | B1 | 9/2001 | Prociw |
| 6,289,677 | B1 | 9/2001 | Prociw |
| 6,345,505 | B1 | 2/2002 | Green |
| 6,823,677 | B2 | 11/2004 | Prociw |
| 7,654,880 | B2 | 2/2010 | Schneider |
| 7,716,933 | B2 | 5/2010 | Prociw |
| 7,743,612 | B2 | 6/2010 | Morenko |
| 8,096,129 | B2 | 1/2012 | Francis |
| 8,205,452 | B2 | 6/2012 | Boardman |
| 8,683,804 | B2 | 4/2014 | Boardman |
| 9,188,337 | B2 | 11/2015 | Stoia |
| 9,366,190 | B2 | 6/2016 | Cramb |
| 10,001,281 | B2 | 6/2018 | Patel |
| 10,054,093 | B2 | 8/2018 | Spivey |
| 10,184,665 | B2 | 1/2019 | Benjamin |

(Continued)

OTHER PUBLICATIONS

EP Search Report for EP Patent Application No. 24190122.2 dated Nov. 26, 2024.

*Primary Examiner* — Devon C Kramer
*Assistant Examiner* — Jingchen Liu
(74) *Attorney, Agent, or Firm* — Getz Balich LLC

(57) ABSTRACT

A fuel injector is provided for a turbine engine. This fuel injector includes a fuel nozzle. The fuel nozzle includes a feed passage, a first exit passage and a gallery. The feed passage extends in the fuel nozzle to a feed passage location along the gallery. The first exit passage extends in the fuel nozzle to a first exit passage location along the gallery. The gallery extends in the fuel nozzle circumferentially about an axis from a first end of the gallery to a second end of the gallery. A size of the gallery decreases and then increases as the gallery extends circumferentially about the axis away from the feed passage location and towards the first exit passage location.

15 Claims, 10 Drawing Sheets

(56)  References Cited

U.S. PATENT DOCUMENTS

| | | | |
|---|---|---|---|
| 10,228,137 B2 | 3/2019 | Kopp-Vaughan | |
| 10,451,282 B2 | 10/2019 | Benjamin | |
| 10,563,587 B2 | 2/2020 | Ozem | |
| 10,591,164 B2 | 3/2020 | Patel | |
| 10,739,006 B2 | 8/2020 | Patel | |
| 10,760,495 B2 | 9/2020 | Hawie | |
| 10,941,941 B2 | 3/2021 | Ramotowski | |
| 11,639,795 B2 | 5/2023 | Swaby | |
| 2004/0040310 A1 | 3/2004 | Prociw | |
| 2005/0198964 A1 | 9/2005 | Myers, Jr. | |
| 2006/0218925 A1 | 10/2006 | Prociw | |
| 2007/0204622 A1 | 9/2007 | Patel | |
| 2009/0255256 A1* | 10/2009 | Mcmasters | F23R 3/286 |
| | | | 60/734 |
| 2011/0031333 A1* | 2/2011 | Short | F23R 3/28 |
| | | | 239/548 |

| | | | |
|---|---|---|---|
| 2011/0197594 A1 | 8/2011 | Khosla | |
| 2013/0283809 A1* | 10/2013 | Twardochleb | F23R 3/36 |
| | | | 60/39.463 |
| 2014/0331676 A1 | 11/2014 | Cramb | |
| 2016/0047315 A1 | 2/2016 | Mccaldon | |
| 2016/0237971 A1 | 8/2016 | Rowan | |
| 2016/0305327 A1 | 10/2016 | Patel | |
| 2016/0363320 A1 | 12/2016 | Benjamin | |
| 2017/0003029 A1 | 1/2017 | Mook | |
| 2017/0037783 A1 | 2/2017 | Ryon | |
| 2017/0153027 A1 | 6/2017 | Yang | |
| 2017/0191457 A1 | 7/2017 | Spivey | |
| 2019/0093562 A1 | 3/2019 | Lau | |
| 2019/0234310 A1 | 8/2019 | Morenko | |
| 2020/0011533 A1 | 1/2020 | Ramotowski | |
| 2020/0103116 A1 | 4/2020 | Morenko | |
| 2020/0208841 A1 | 7/2020 | Chabaille | |
| 2020/0355370 A1 | 11/2020 | Jette | |
| 2022/0364730 A1 | 11/2022 | Swaby | |

* cited by examiner

ARCUATE FUEL GALLERY FOR TURBINE ENGINE FUEL NOZZLE

TECHNICAL FIELD

This disclosure relates generally to a turbine engine and, more particularly, to a fuel injector for the turbine engine.

BACKGROUND INFORMATION

A fuel nozzle for a gas turbine engine includes an internal fuel circuit. This fuel circuit is configured to direct fuel through the fuel nozzle to a fuel nozzle outlet for injection into a combustion chamber of the gas turbine engine. The fuel circuit may include an annular fuel gallery that distributes the fuel to multiple exit passages. While such a fuel nozzle has various benefits, there is still room in the art for improvement.

SUMMARY

According to an aspect of the present disclosure, a fuel injector is provided for a turbine engine. This fuel injector includes a fuel nozzle. The fuel nozzle includes a feed passage, a first exit passage and a gallery. The feed passage extends in the fuel nozzle to a feed passage location along the gallery. The first exit passage extends in the fuel nozzle to a first exit passage location along the gallery. The gallery extends in the fuel nozzle circumferentially about an axis from a first end of the gallery to a second end of the gallery. A size of the gallery decreases and then increases as the gallery extends circumferentially about the axis away from the feed passage location and towards the first exit passage location.

According to another aspect of the present disclosure, another fuel injector is provided for a turbine engine. This fuel injector includes a fuel nozzle. The fuel nozzle includes a feed passage, a plurality of exit passage and a gallery. The feed passage extends in the fuel nozzle to the gallery. Each of the first exit passages extends in the fuel nozzle to the gallery. The gallery extends in the fuel nozzle circumferentially about an axis from a first end of the gallery to a second end of the gallery. A size of the gallery undulates as the gallery extends circumferentially about the axis from the first end of the gallery to the second end of the gallery.

According to still another aspect of the present disclosure, another fuel injector is provided for a turbine engine. This fuel injector includes a fuel nozzle. The fuel nozzle includes a feed passage, a plurality of exit passage and a gallery. The feed passage extends in the fuel nozzle to the gallery. Each of the first exit passages extends in the fuel nozzle to the gallery. The gallery extends in the fuel nozzle circumferentially about an axis from a first end of the gallery to a second end of the gallery. The gallery extends in the fuel nozzle radially from an inner side surface to an outer side surface. The inner side surface has a radially undulating geometry. The outer side surface has an arcuate geometry with a uniform radius circumferentially about the axis.

An axial height of the gallery may uniformly or incrementally decrease as the gallery extends circumferentially about the axis from the first end of the gallery to the second end of the gallery.

The size of the gallery may be a cross-sectional area of the gallery.

A radial width of the gallery may decrease and then increase as the gallery extends circumferentially about the axis away from the feed passage location and towards the first exit passage location.

The size of the gallery may be a radial width of the gallery.

An axial height of the gallery may decrease as the gallery extends circumferentially about the axis from the feed passage location to the first exit passage location.

The size of the gallery at the feed passage location and the size of the gallery at the first exit passage location may each be greater than the size of the gallery at an intermediate location circumferentially between the feed passage location and the first exit passage location along the gallery.

The size of the gallery at the feed passage location may be greater than the size of the gallery at the first exit passage location.

The fuel nozzle may also include a second exit passage that extends in the fuel nozzle to a second exit passage location along the gallery. The size of the gallery may decrease and then may increase as the gallery extends circumferentially about the axis away from the first exit passage location and towards the second exit passage location.

A first intermediate location may be circumferentially between the feed passage location and the first exit passage location along the gallery. A second intermediate location may be circumferentially between the first exit passage location and the second exit passage location along the gallery. The size of the gallery at the first intermediate location may be greater than the size of the gallery at the second intermediate location.

The size of the gallery at the feed passage location may be greater than the size of the gallery at the first exit passage location. The size of the gallery at the first exit passage location may be greater than the size of the gallery at the second exit passage location.

The fuel gallery may extend radially in the fuel nozzle from an inner side surface to an outer side surface. The inner side surface may have a radially undulating geometry.

The fuel gallery may extend radially in the fuel nozzle from an inner side surface to an outer side surface. The outer side surface may have an arcuate geometry with a uniform radius circumferentially about the axis.

The fuel gallery may extend axially in the fuel nozzle from a first side surface to a second side surface. The first side surface may have a spiral geometry.

The feed passage may extend to a feed passage orifice in the first side surface.

The fuel gallery may extend axially in the fuel nozzle from a first side surface to a second side surface. The second side surface may have an arcuate planar geometry.

The first exit passage may extend to a first exit passage orifice in the second side surface.

The gallery may be formed by a channel, a first recess and a second recess. The channel may extend in the fuel nozzle circumferentially about the axis from the first end of the gallery to the second end of the gallery. The first recess may be arranged at the first end of the gallery. The first recess may project radially into the fuel nozzle from the channel. The second recess may be circumferentially spaced from the first recess. The second recess may project radially into the fuel nozzle from the channel.

The gallery may extend, more than two-hundred and seventy degrees and less than three-hundred and sixty degrees, circumferentially about the axis from the first end of the gallery to the second end of the gallery.

The gallery may extend, less than one-hundred and eighty degrees, circumferentially about the axis from the first end of the gallery to the second end of the gallery.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
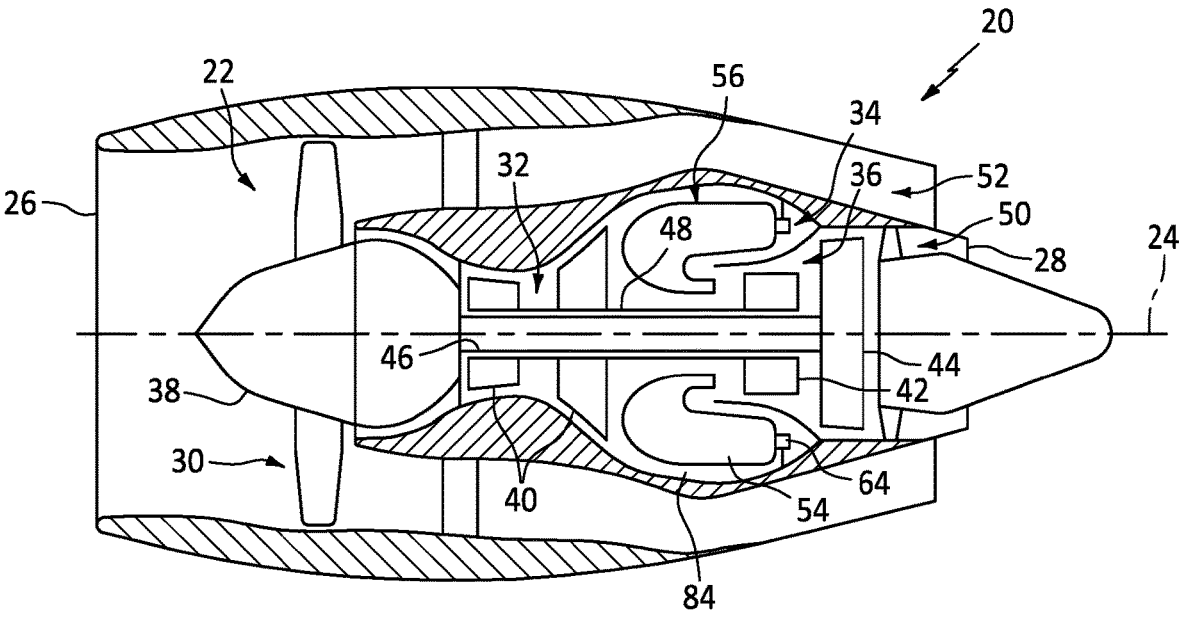
FIG. 1 is a side sectional schematic illustration of an aircraft propulsion system.

FIG. 1 illustrates an aircraft propulsion system 20 with a turbofan gas turbine engine 22. This turbine engine 22 extends along a centerline 24 of the engine 22 between an upstream airflow inlet 26 and a downstream airflow exhaust 28. The turbine engine 22 includes a fan section 30, a compressor section 32, a combustor section 34 and a turbine section 36.

The fan section 30 includes a fan rotor 38. The compressor section 32 includes a compressor rotor 40. The turbine section 36 includes a high pressure turbine (HPT) rotor 42 and a low pressure turbine (LPT) rotor 44, where the LPT rotor 44 is configured as a power turbine rotor. Each of these bladed engine rotors 38, 40, 42 and 44 includes a plurality of rotor blades arranged circumferentially around and connected to one or more respective rotor disks.

The fan rotor 38 is connected to the LPT rotor 44 through a low speed shaft 46. The compressor rotor 40 is connected to the HPT rotor 42 through a high speed shaft 48. The low speed shaft 46 and the high speed shaft 48 may be concentric with one another and rotatable about the engine centerline 24; e.g., a rotational axis. The low speed shaft 46 extends through a bore of the high speed shaft 48 between the fan rotor 38 and the LPT rotor 44.

During operation, air enters the turbine engine 22 through the airflow inlet 26. This air is directed through the fan section 30 and into a core flowpath 50 and a bypass flowpath 52. The core flowpath 50 extends sequentially through the engine sections 32, 34 and 36; e.g., a core of the turbine engine 22. The air within the core flowpath 50 may be referred to as "core air". The bypass flowpath 52 extends through a bypass duct and bypasses (e.g., is radially outboard of and extends along) the engine core. The air within the bypass flowpath 52 may be referred to as "bypass air".

The core air is compressed by the compressor rotor 40 and directed into an annular combustion chamber 54 of an annular combustor 56 in the combustor section 34. Fuel is injected into the combustion chamber 54 and mixed with the compressed core air to provide a fuel-air mixture. This fuel-air mixture is ignited and combustion products thereof flow through and sequentially cause the HPT rotor 42 and the LPT rotor 44 to rotate. The rotation of the HPT rotor 42 drives rotation of the compressor rotor 40 and, thus, compression of air received from an inlet into the core flowpath 50. The rotation of the LPT rotor 44 drives rotation of the fan rotor 38, which propels bypass air through and out of the bypass flowpath 52. The propulsion of the bypass air may account for a significant portion (e.g., a majority) of thrust generated by the turbine engine 22.

Figure 2:
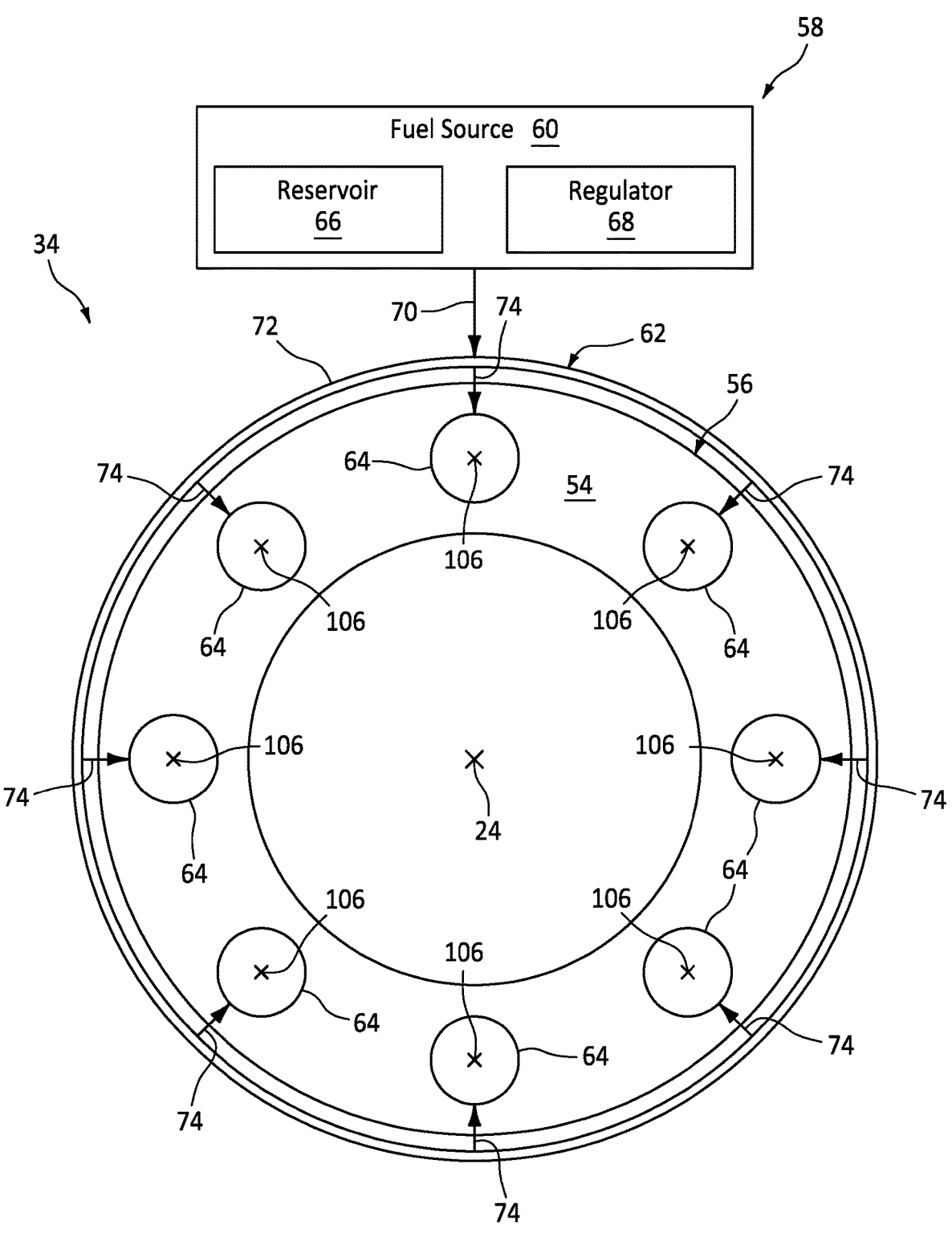
FIG. 2 is a cross-sectional schematic illustration of a fuel system for delivering fuel to a turbine engine combustor.

Referring to FIG. 2, the turbine engine 22 includes a fuel system 58 for injecting the fuel into the combustion chamber 54. This fuel system 58 includes a fuel source 60, a fuel supply circuit 62 and one or more fuel injectors 64.

The fuel source 60 of FIG. 2 includes a fuel reservoir 66 and a fuel regulator 68. The fuel reservoir 66 may be configured as or otherwise include a container; e.g., a tank, a cylinder, a pressure vessel, a bladder, etc. The fuel reservoir 66 is configured to contain and hold a quantity of the fuel. The fuel regulator 68 may be configured as or otherwise include a pump and/or a valve. The fuel regulator 68 is configured to control flow of the fuel from the fuel reservoir 66 to one or more downstream components of the fuel system 58. The fuel regulator 68 of FIG. 2, for example, directs (e.g., pumps) the fuel out from the fuel reservoir 66 to the fuel supply circuit 62 for delivery to fuel injectors 64.

The fuel supply circuit 62 is configured to deliver the fuel received from the fuel source 60 to the fuel injectors 64. The fuel supply circuit 62 of FIG. 2, for example, includes a fuel supply circuit input passage 70, a fuel supply circuit manifold 72 and one or more fuel supply circuit output passages 74. The input passage 70 is between, connected to and fluidly couples the fuel source 60 and the manifold 72. The manifold 72 is between, connected to and fluidly couples the input passage 70 and the output passages 74. The manifold 72 is thereby operable to (e.g., substantially evenly) distribute the fuel received from the fuel source 60 through the input passage 70 to the output passages 74. Each of the output passages 74 is between, connected to and fluidly couples the manifold 72 and a respective one of the fuel injectors 64. Each output passage 74 is thereby operable to direct the fuel received from the manifold 72 to the respective fuel injector 64.

Figure 3:
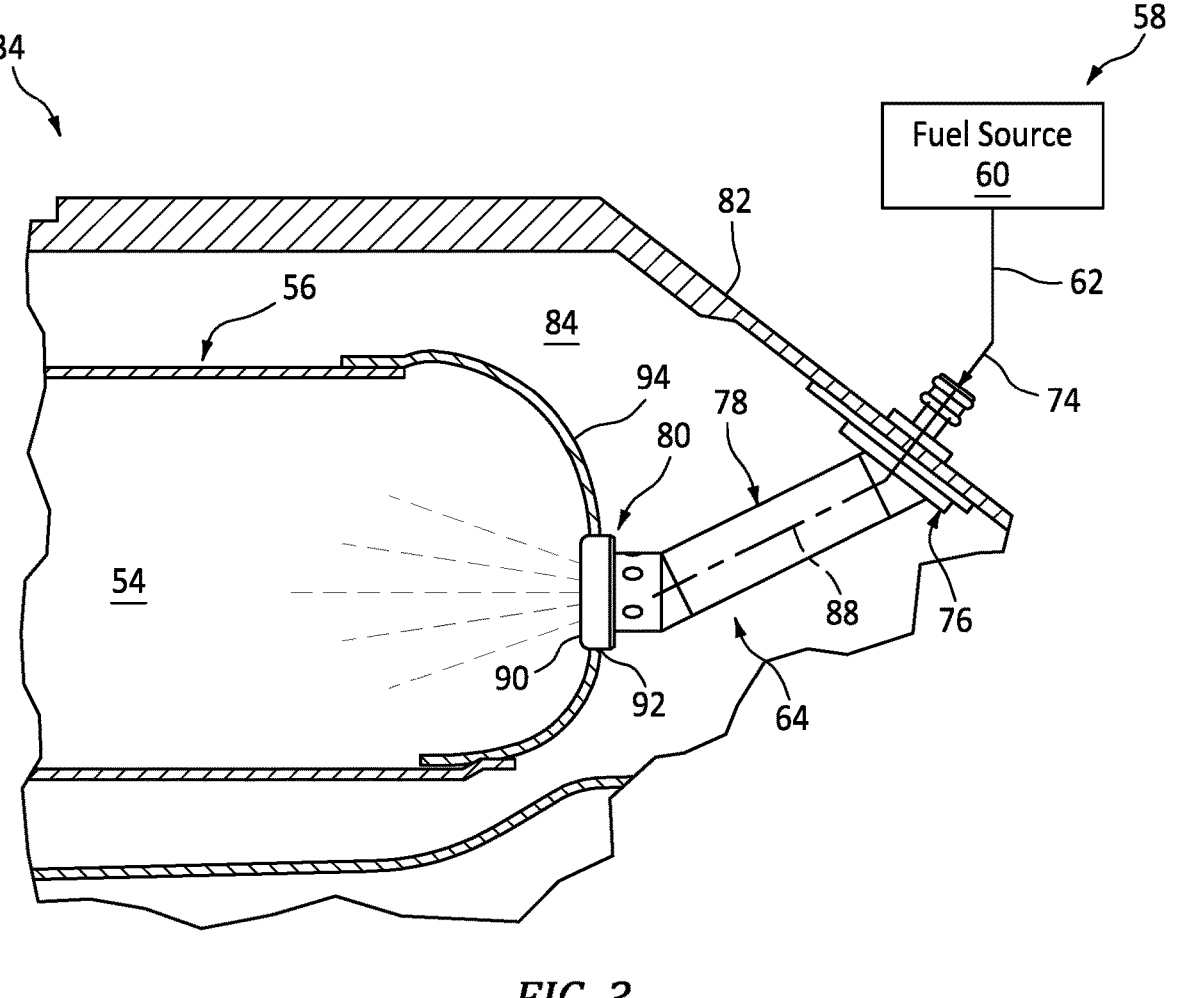
FIG. 3 is a partial side sectional illustration of the turbine engine combustor and the fuel delivery system.

The fuel injectors 64 of FIG. 2 are arranged circumferentially about the engine centerline 24 in an annular array. Referring to FIG. 3, each fuel injector 64 includes a fuel injector base 76, a fuel injector stem 78 and a fuel injector nozzle 80, referred to below as a "fuel nozzle".

The injector base 76 is configured to connect the respective fuel injector 64 to a static structure of the turbine engine 22. The injector base 76 of FIG. 3, for example, mounts the respective fuel injector 64 and its injector stem 78 to a case 82 of the turbine engine 22. Briefly, this turbine engine case 82 may be configured as a diffuser case. The turbine engine case 82 of FIG. 3, for example, is spaced from and circumscribes the combustor 56 so as to at least partially form a diffuser plenum 84 surrounding the combustor 56.

The injector stem 78 is configured to locate and support the fuel nozzle 80. The injector stem 78, for example, structurally connects the fuel nozzle 80 to the injector base 76. The injector stem 78 of FIG. 3 extends within/through the diffuser plenum 84 from the injector base 76 to the fuel nozzle 80. The injector stem 78 also forms and/or shields at least one internal fuel injector fuel conduit 88 that fluidly couples a respective one of the output passages 74 to the fuel nozzle 80.

Figure 4:
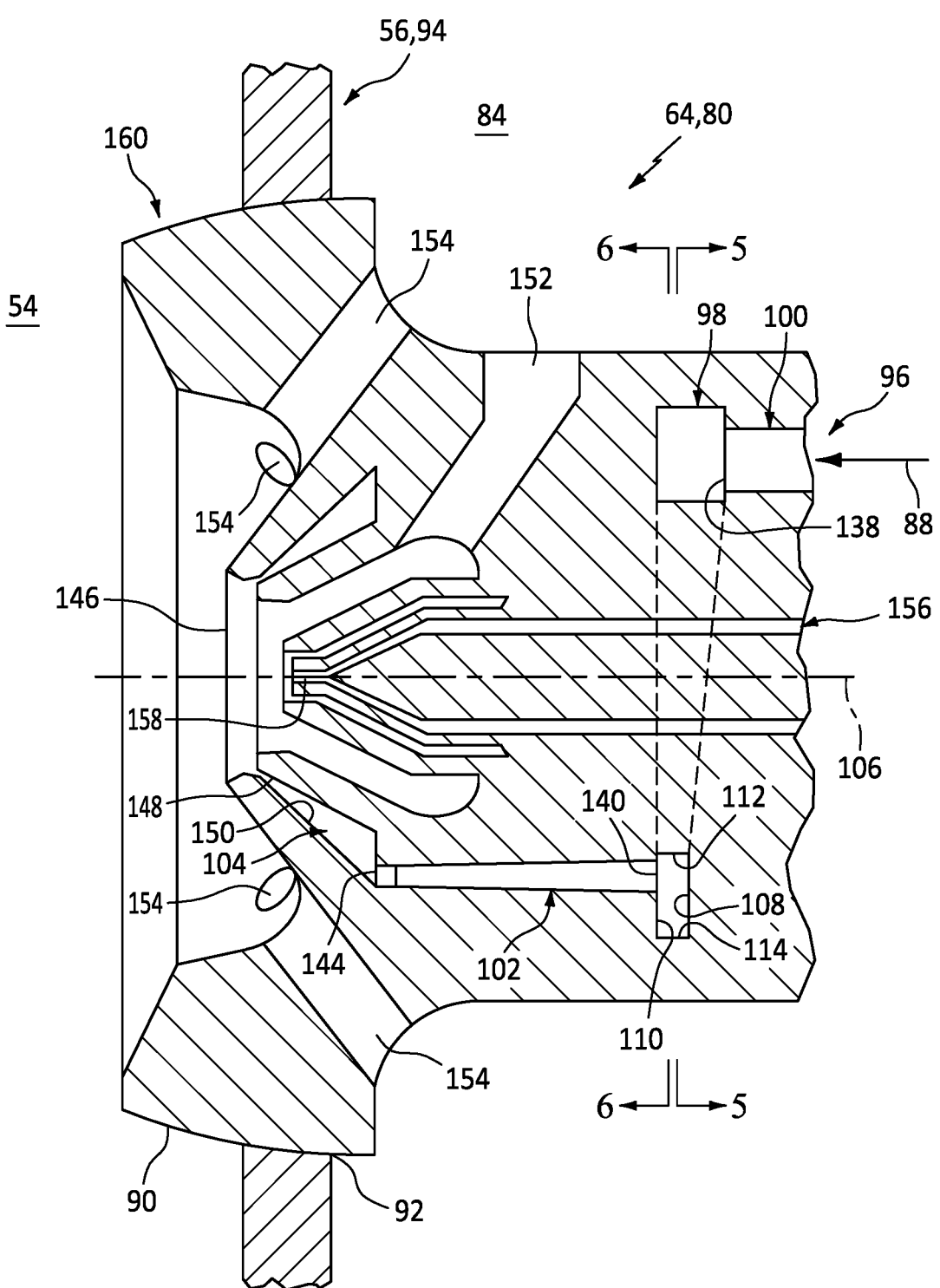
FIG. 4 is a side sectional illustration of a fuel nozzle arranged with a portion of a combustor wall.

Referring to FIG. 4, the fuel nozzle 80 is mated with the combustor 56. A head 90 of the fuel nozzle 80 of FIG. 4, for example, is received by and may project through a receptacle 92 in a wall 94 of the combustor 56; e.g., an opening in an annular bulkhead of the combustor 56. The fuel nozzle head 90 may be configured to float within the receptacle 92. Alternatively, the fuel nozzle head 90 may be fixedly attached to the combustor wall 94.

The fuel nozzle 80 of FIG. 4 includes an internal fuel nozzle circuit 96. This fuel nozzle circuit 96 is configured to receive the fuel from the fuel conduit 88 and direct that received fuel out of the fuel nozzle head 90 into the combustion chamber 54. The fuel nozzle circuit 96 of FIG. 4 includes an arcuate (non-annular) fuel gallery 98, a fuel feed passage 100 and a plurality of fuel exit passages 102A-D (generally referred to as "102"); see also FIGS. 5-8. The fuel nozzle circuit 96 of FIG. 4 may also include an annular fuel film passage 104.

Figure 5:
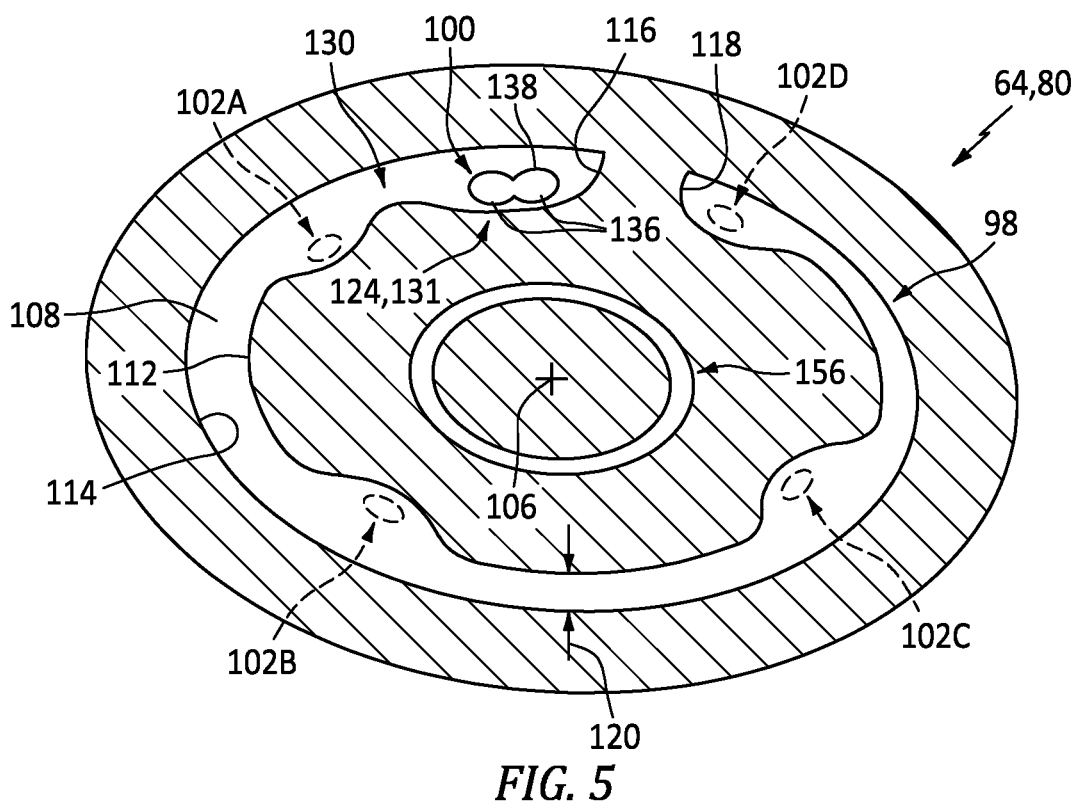
FIG. 5 is a perspective cross-sectional illustration of the fuel nozzle taken along line 5-5 in FIG. 4.
Figure 6:
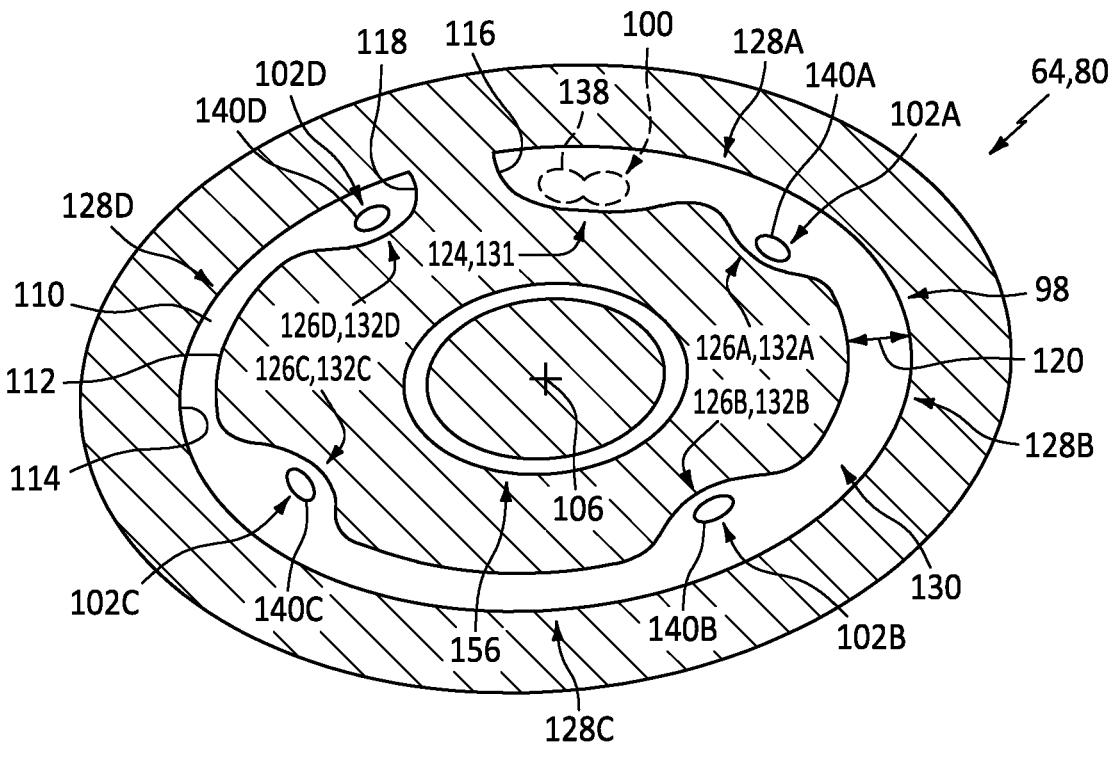
FIG. 6 is a perspective cross-sectional illustration of the fuel nozzle taken along line 6-6 in FIG. 4.

The fuel gallery 98 extends axially within the fuel nozzle 80 along an axis 106 between and to an internal axial first side surface 108 (e.g., back, upstream side surface) of the fuel nozzle 80 and an opposite internal axial second side surface 110 (e.g., front, downstream side surface) of the fuel nozzle 80, which axis 106 may be an axial centerline and/or a spray axis of the fuel nozzle 80. The fuel gallery 98 extends radially within the fuel nozzle 80 relative to the axis 106 between and to an internal radial inner side surface 112 of the fuel nozzle 80 and an opposite internal radial outer side surface 114 of the fuel nozzle 80. Referring to FIGS. 5 and 6, the fuel gallery 98 and each of its surfaces 108, 110, 112, 114 extend circumferentially within the fuel nozzle 80 partially around the axis 106 between and to a circumferential first end 116 of the fuel gallery 98 and an opposite circumferential second end 118 of the fuel gallery 98. More particularly, the fuel gallery 98 extends circumferentially about the axis 106 from the gallery first end 116 to the gallery second end 118 more than two-hundred and seventy degrees (270°) but less than three-hundred and sixty degrees (360°). The fuel gallery 98 of FIGS. 5 and 6, for example, extends between three-hundred and fifteen degrees (315°) and three-hundred and forty-five degrees (345°); e.g., about (e.g., +/−2°) three-hundred and thirty degrees (330°). The present disclosure, of course, is not limited to such an exemplary fuel gallery configuration. The fuel gallery 98, for example, may extend less than two-hundred and seventy degrees (270°) circumferentially about the axis 106 from the gallery first end 116 to the gallery second end 118.

The fuel gallery first end 116 may be configured as an upstream end of the fuel gallery 98. The fuel gallery second end 118 may be configured as a downstream end of the fuel gallery 98.

Referring to FIGS. 5-8, the fuel gallery 98 is configured with a size that continuously or intermittently changes as the fuel gallery 98 extends circumferentially about the axis 106 from or about the gallery first end 116 to or about the gallery second end 118. In particular, the fuel gallery 98 has a cross-sectional area, a radial width 120 (see FIGS. 5 and 6) and an axial height 122 (see FIGS. 7 and 8 which positively depict internal volumes of the fuel nozzle circuit 96) which may be measured in a radial reference plane parallel with and coincident to the axis 106. The cross-sectional area continuously or intermittently undulates (e.g., decreases and then increases and then decreases, and so on) as the fuel gallery 98 extends circumferentially about the axis 106 from or about the gallery first end 116 to or about the gallery second end 118. The radial width 120 continuously or intermittently undulates (e.g., decreases and then increases and then decreases, and so on) as the fuel gallery 98 extends circumferentially about the axis 106 from or about the gallery first end 116 to or about the gallery second end 118. This radial width 120 is a radial distance from the inner side surface 112 to the outer side surface 114 in the radial reference plane. The axial height 122 may continuously or intermittently decrease (e.g., the fuel gallery 98 axially tapers) as the fuel gallery 98 extends circumferentially about the axis 106 from or about the gallery first end 116 to or about the gallery second end 118. This axial height 122 is an axial distance from the first side surface 108 to the second side surface 110 in the radial reference plane.

Figure 9:
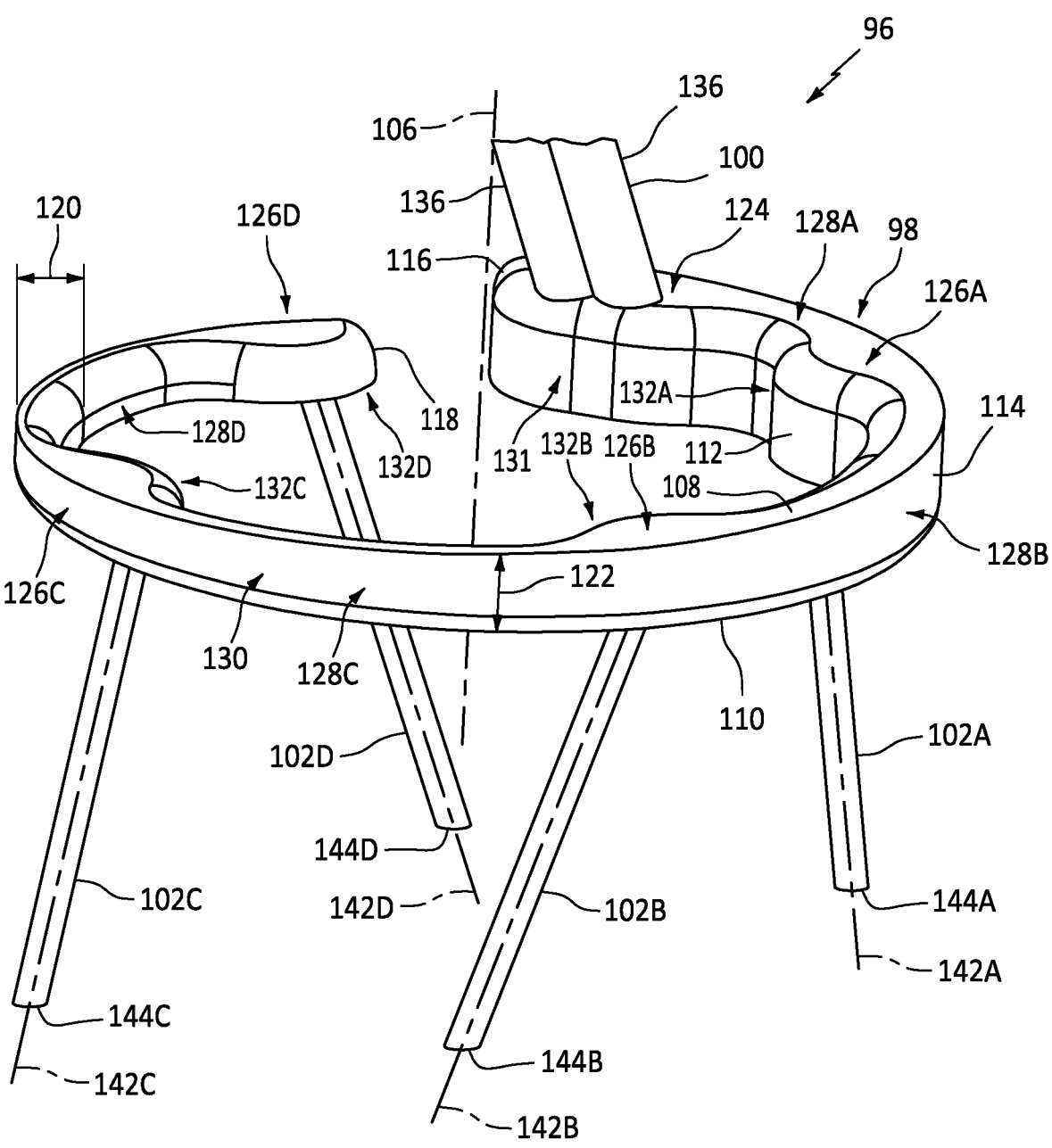
FIG. 9 is a perspective illustration of a portion of the fuel nozzle circuit, where the internal volumes of the fuel nozzle circuit are positively depicted.

Referring to FIG. 9 which positively depicts internal volumes of the fuel nozzle circuit 96, the cross-sectional area at (e.g., on, adjacent or proximate) a feed passage location 124 ("feed location") and the cross-sectional area at a first exit passage location 126A ("first exit location") are each greater than the cross-sectional area at a first intermediate location 128A (e.g., midway) circumferentially between the feed location 124 and the first exit location 126A along the fuel gallery 98. The cross-sectional area at the feed location 124 of FIG. 9 is also greater than the cross-sectional area at the first exit location 126A. The cross-sectional area at the first exit location 126A and the cross-sectional area at a second exit passage location 126B ("second exit location") are each greater than the cross-sectional area at a second intermediate location 128B (e.g., midway) circumferentially between the first exit location 126A and the second exit location 126B along the fuel gallery 98. The cross-sectional area at the first exit location 126A of FIG. 9 is also greater than the cross-sectional area at the second exit location 126B. The cross-sectional area at the first intermediate location 128A of FIG. 9 is also greater than the cross-sectional area at the second intermediate location 128B. The cross-sectional area at the second exit location 126B and the cross-sectional area at a third exit passage location 126C ("third exit location") are each greater than the cross-sectional area at a third intermediate location 128C (e.g., midway) circumferentially between the second exit location 126B and the third exit location 126C along the fuel gallery 98. The cross-sectional area at the second exit location 126B of FIG. 9 is also greater than the cross-sectional area at the third exit location 126C. The cross-sectional area at the second intermediate location 128B of FIG. 9 is also greater than the cross-sectional area at the third intermediate location 128C. The cross-sectional area at the third exit location 126C and the cross-sectional area at a fourth exit passage location 126D ("fourth exit location") are each greater than the cross-sectional area at a fourth intermediate location 128D (e.g., midway) circumferentially between the third exit location 126C and the fourth exit location 126D along the fuel gallery 98. The cross-sectional area at the third exit location 126C of FIG. 9 is also greater than the cross-sectional area at the fourth exit location 126D. The cross-sectional area at the third intermediate location 128C of FIG. 9 is also greater than the cross-sectional area at the fourth intermediate location 128D. The foregoing locations 124, 128A, 126A, 128B, 126B, 128C, 126C, 128D and 126D are arranged sequentially and circumferentially along the fuel gallery 98 between from the gallery first end 116 to the gallery second end 118.

The radial width 120 at the feed location 124 and the radial width 120 at the first exit location 126A are each greater than the radial width 120 area at the first intermediate location 128A. The radial width 120 at the feed location 124 of FIG. 9 may also be greater than (or equal to) the radial width 120 at the first exit location 126A. The radial width 120 at the first intermediate location 128A of FIG. 9 is also greater than the radial width 120 at the second intermediate location 128B. The radial width 120 at the first exit location 126A and the radial width 120 at the second exit location 126B are each greater than the radial width 120 at the second intermediate location 128B. The radial width 120 at the first exit location 126A of FIG. 9 may also be greater than (or equal to) the radial width 120 at the second exit location 126B. The radial width 120 at the second intermediate location 128B of FIG. 9 is also greater than the radial width 120 at the third intermediate location 128C. The radial width 120 at the second exit location 126B and the radial width 120 at the third exit location 126C are each greater than the radial width 120 at the third intermediate location 128C. The radial width 120 at the second exit location 126B of FIG. 9 may also be greater than (or equal to) the radial width 120 at the third exit location 126C. The radial width 120 at the third exit location 126C and the radial width 120 at the fourth exit location 126D are each greater than the radial width 120 at the fourth intermediate location 128D. The radial width 120 at the third exit location 126C of FIG. 9 may also be greater than (or equal to) the radial width 120 at the fourth exit location 126D. The radial width 120 at the third intermediate location 128C of FIG. 9 is also greater than the radial width 120 at the fourth intermediate location 128D.

The fuel gallery 98 may be formed by an arcuate channel 130 and a plurality of recesses 131 and 132A-D (generally referred to as "132"); e.g., notches, grooves, indentations, etc. The arcuate channel 130 continuously or intermittently radially and/or axially tapers as the fuel gallery 98 extends circumferentially about the axis 106 within the fuel nozzle 80 from or about the gallery first end 116 to or about the gallery second end 118. The recesses 131 and 132A-D are arranged circumferentially about the axis 106/along the fuel gallery 98 respectively at the locations 126A-D, where each recess 131, 132 is circumferentially spaced from each respective neighboring (e.g., circumferentially adjacent) recess 131, 132. Referring to FIG. 6, the recesses 131, 132 are disposed radially inward of the arcuate channel 130. Each recess 131, 132 of FIG. 6, for example, projects radially into the fuel nozzle 80 from the arcuate channel 130. With this arrangement, the outer side surface 114 forms an outer side of the arcuate channel 130. The inner side surface 112 collectively forms inner sides of the arcuate channel 130 and the recesses 131 and 132.

Figure 7:
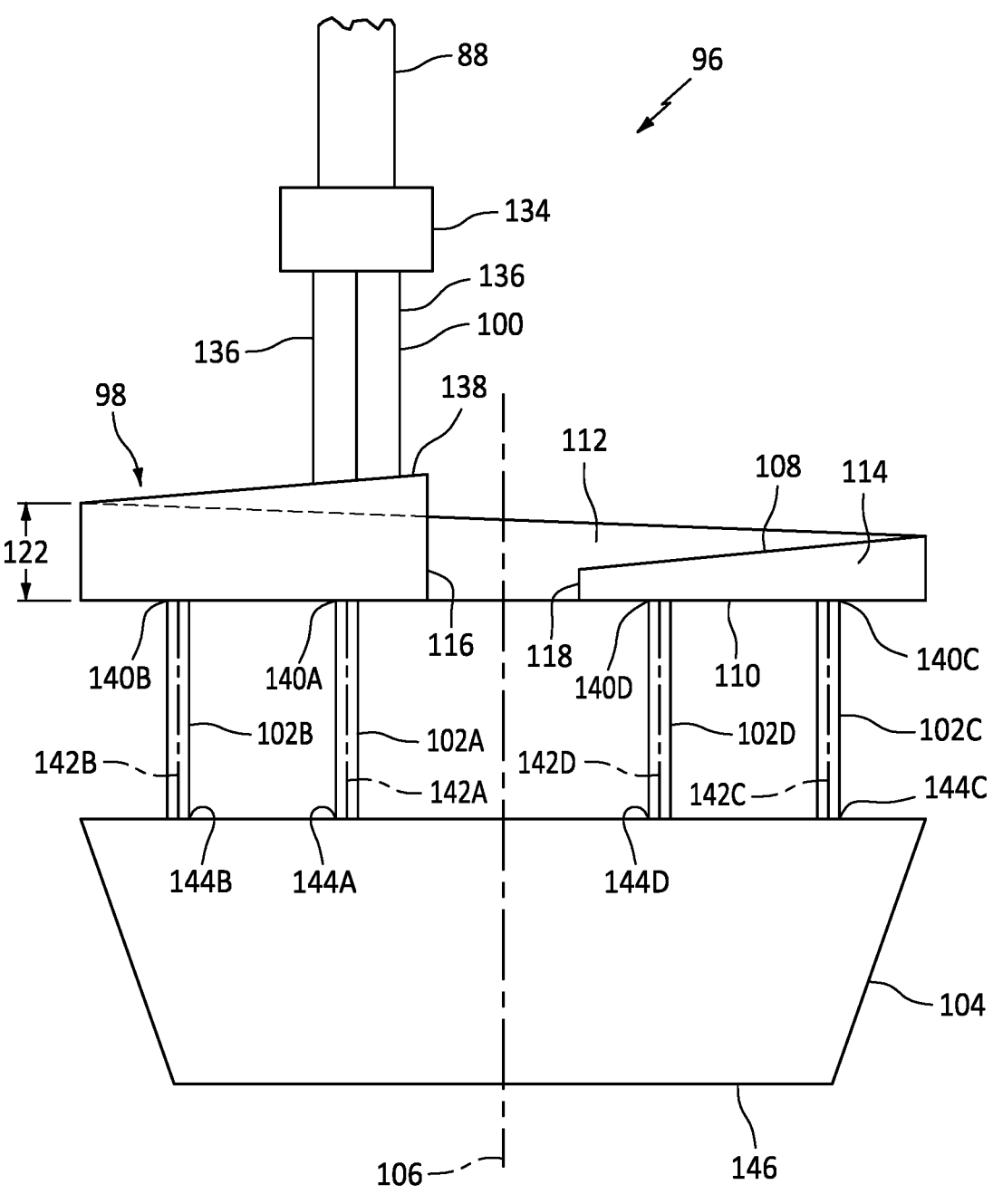
FIGS. 7 and 8 are side illustrations of a fuel nozzle circuit within the fuel nozzle, where internal volumes of the fuel nozzle circuit are positively depicted.

The inner side surface 112 may have a radially undulating geometry (e.g., a wavy geometry) as the inner side surface 112 extends circumferentially about the axis 106 from or about the gallery first end 116 to or about the gallery second end 118. The outer side surface 114, by contrast, may have an arcuate geometry with a uniform (e.g., constant) radius as the outer side surface 114 extends circumferentially about the axis 106 from or about the gallery first end 116 to or about the gallery second end 118. Referring to FIG. 7, the first side surface 108 may have a spiral geometry as the first side surface 108 extends circumferentially about the axis 106 from or about the gallery first end 116 to or about the gallery second end 118. The second side surface 110, by contrast, may have an arcuate planar geometry (e.g., a flat geometry) as the second side surface 110 extends circumferentially about the axis 106 from or about the gallery first end 116 to or about the gallery second end 118. However, it is contemplated second side surface 110 may alternatively have a spiral geometry and/or the first side surface 108 may have an arcuate planar geometry in other embodiments.

The feed passage 100 configured to fluidly couple the fuel conduit 88 to the fuel gallery 98. The feed passage 100 of FIG. 7, for example, is fluidly coupled to the fuel conduit 88 through, for example, a coupling 134. This coupling 134 may be configured as an internal reservoir or an internal gallery. The feed passage 100 extends within (or into) the fuel nozzle 80 (see FIG. 4) to the fuel gallery 98. The feed passage 100 of FIGS. 5 and 7 is formed by multiple parallel bores 136, where these bores 136 are interconnected (e.g., fluidly coupled) along their longitudinal lengths so as to collectively form the single feed passage 100. The present disclosure, however, is not limited to such an exemplary arrangement. For example, in other embodiments, the feed passage 100 may be formed by a single bore, or the bores 136 may be fluidly decoupled to provide multiple (e.g., parallel) feed passages to the fuel gallery 98.

The feed passage 100 of FIG. 5 has a feed passage orifice 138 (e.g., a feed passage outlet orifice, a fuel gallery inlet orifice) in the gallery first side surface 108. The feed passage orifice 138 is located at the feed location 124. More particularly, the feed passage orifice 138 may radially overlap the feed passage recess 131 and the arcuate channel 130. The feed passage orifice 138 is disposed at the gallery first end 116.

Figure 8:
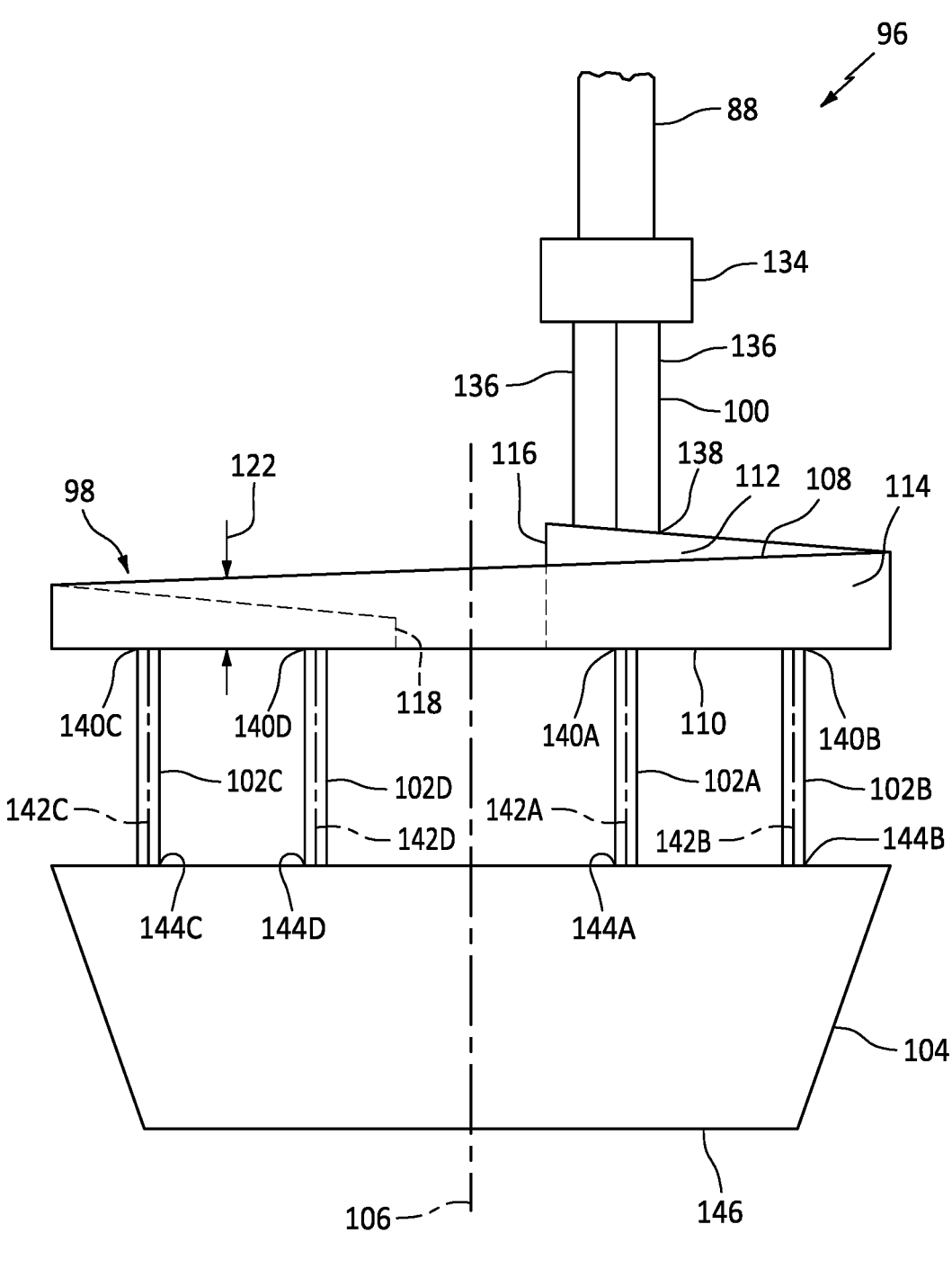

The exit passages 102 of FIG. 4 are configured to fluidly couple the fuel gallery 98 to the fuel film passage 104. Each of the exit passages 102 of FIG. 4, for example, extends within the fuel nozzle 80 between and to the fuel gallery 98 and the fuel film passage 104. Referring to FIGS. 7 and 8, the exit passages 102 are thereby fluidly coupled in parallel between the fuel gallery 98 and the fuel film passage 104.

Referring to FIG. 6, the exit passages 102 are arranged (e.g., and equally spaced) circumferentially about the axis 106 in an array; e.g., an arcuate array. Each of the exit passages 102 of FIG. 6 has a respective exit passage orifice 140A-D (generally referred to as "140") (e.g., an exit passage inlet orifice, a fuel gallery outlet orifice) in the gallery second side surface 110. The exit passage orifices 140A-D are respectively located at the exit locations 126A-D. More particularly, each exit passage orifice 140A-D may be radially aligned with the respective recess 132A-D, but may be offset from the arcuate channel 130. It is contemplated, however, one or more of the exit passage orifices 140 may alternatively partially radially overlap the arcuate channel 130. The exit passage orifices 140 are arranged circumferentially between the feed passage orifice 138 and the gallery second end 118. The (e.g., downstream-most) exit passage orifice 140D is disposed at the gallery second end 118.

Referring to FIG. 9, each of the exit passages 102 has a cross-sectional area when viewed, for example, perpendicular to a longitudinal centerline 142A-D (generally referred to as "142") of the respective exit passage 140A-D. The exit passage cross-sectional areas may be equal. Alternatively, the cross-sectional area of one or more of the exit passages 102 may be different (e.g., greater or less) than the cross-sectional area of one or more of the other exit passages 102.

One or more of the exit passage longitudinal centerlines 142 may each be configured non-parallel with the axis 106.

Each exit passage longitudinal centerlines 142 of FIG. 9, for example, is circumferentially skewed such that its inlet orifice (the exit passage orifice 140) is circumferentially offset to its outlet orifice 144A-D (generally referred to as "144"). The inlet orifice (the exit passage orifice 140) may also or alternatively be radially offset from the outlet orifice 144 such that the respective exit passage longitudinal centerline 142 is also or alternatively radially skewed. Alternatively, at least a portion or an entirety of each exit passage longitudinal centerline 142 may be configured parallel with the axis 106.

Referring to FIG. 4, the fuel film passage 104 is configured to fluidly couple the exit passages 102 with a plenum outside of the fuel nozzle head 90; e.g., the combustion chamber 54. The fuel film passage 104 of FIG. 4, for example, extends axially within the fuel nozzle 80 along the axis 106 between and to the exit passages 102 and their outlet orifices 144 to a fuel nozzle outlet orifice 146 at a distal end of the fuel nozzle head 90. The fuel film passage 104 extends radially within the fuel nozzle 80 between and to a (e.g., frustoconical) radial inner surface 148 and an opposing (e.g., frustoconical) radial outer surface 150. The fuel film passage 104 extends circumferentially completely around the axis 106, thereby configuring the fuel film passage 104 as an annulus; e.g., a frustoconical annular passage.

During fuel injector operation, the fuel conduit 88 delivers the fuel to the feed passage 100. The feed passage 100 directs the received fuel into the fuel gallery 98. The fuel gallery 98 distributes the fuel to the exit passages 102. Each exit passage 102 injects the fuel as a jet into the fuel film passage 104 to impinge against the film passage outer surface 150. This impingement may disperse the fuel jet into a film and/or may vaporize the fuel. The fuel film passage 104 directs the fuel (e.g., film of vaporized fuel) out of the fuel nozzle head 90 via the fuel nozzle outlet orifice 146 and into the combustion chamber 54 for subsequent ignition and combustion.

Within the fuel gallery 98 of FIG. 6, the fuel flows circumferentially in a (e.g., clockwise) direction from the gallery first end 116 to the gallery second end 118 and is (e.g., substantially equally) distributed to each of the exit passage orifices 140. A velocity of the fuel at each of the locations 124, 126 and/or 128 may be substantially equal. For example, the velocity of the fuel flowing within the fuel gallery 98 at and/or about the first exit location 126A may be approximately equal to (e.g., within +/−5% or 10%) the velocity of the fuel flowing within the fuel gallery 98 at and/or about the second exit location 126B, and so on. Moreover, the velocity of the fuel flowing within the fuel gallery 98 at and/or about the first exit location 126A may be approximately equal to (e.g., within +/−5% or 10%) the velocity of the fuel flowing within the fuel gallery 98 at and/or about the first intermediate location 128A, and so on. The fuel gallery 98, more particularly, is tailored to maintain an approximately uniform fuel velocity within the fuel gallery 98. By maintaining a relatively high velocity of fuel flowing through the fuel gallery 98, there is less time for the fuel flowing in the fuel gallery 98 to heat up and possibly coke (e.g., form hardened deposits, sediment) along the surfaces 108, 110, 112 and 114 of the fuel gallery 98.

Figure 10:
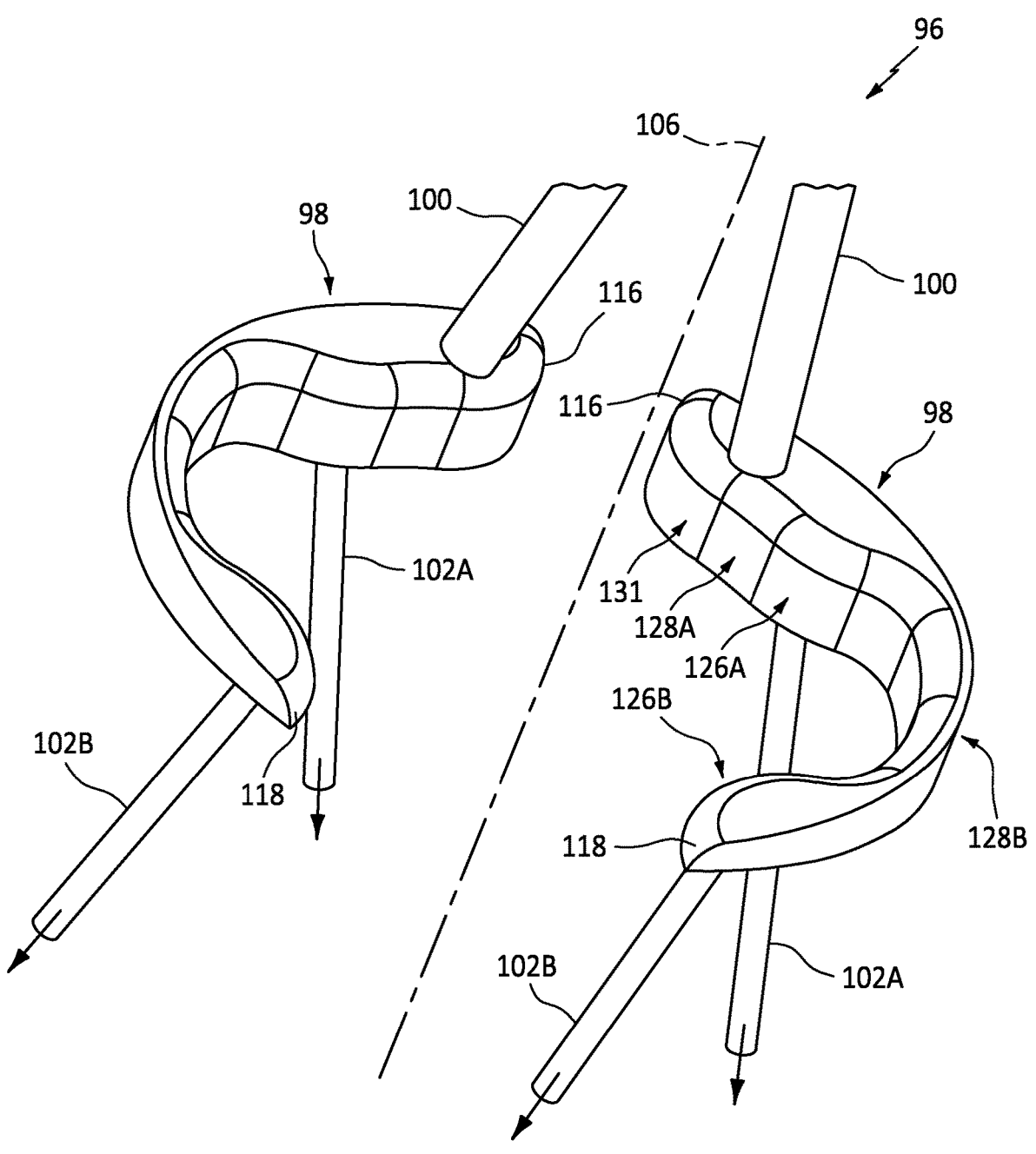
FIG. 10 is a perspective illustration of a portion of the fuel nozzle circuit configured with multiple fuel galleries, where the internal volumes of the fuel nozzle circuit are positively depicted.

In some embodiments, referring to FIG. 10, a single substantially annular gallery may be divided into two (or more) discrete arcuate fuel galleries 98. Each of these fuel galleries 98 may be generally configured as described above; however, each fuel gallery 98 may extend circumferentially within the fuel nozzle 80 less than one-hundred and eighty degrees (180°) around the axis 106 to its respective gallery ends 116 and 118. For example, each fuel gallery 98 may extend between one-hundred and thirty-five degrees (135°) and one-hundred and seventy-five degrees (175°). In another example, each fuel gallery 98 may extend between ninety degrees (90°) and one-hundred and thirty-five degrees (135°). In still another example, each fuel gallery 98 may extend between forty-five degrees (45°) and ninety degrees (90°). The present disclosure, of course, is not limited to the foregoing exemplary ranges.

In some embodiments, referring to FIG. 4, each fuel nozzle 80 may be configured with one or more air passages 152 and 154. Each air passage 152, 154 of FIG. 4 is configured to direct compressed air from the diffuser plenum 84 into the combustion chamber 54. Each air passage 152, 154 of FIG. 4 is further configured to promote mixing of the compressed air with the fuel injected into the combustion chamber 54.

In some embodiments, each fuel nozzle 80 may be configured with a supplemental fuel circuit 156. This supplemental fuel circuit 156 may include a central fuel exit passage 158 along the axis 106. The supplemental fuel circuit 156 may be configured as a pilot fuel circuit, which may receive and inject fuel during turbine engine startup. The supplemental fuel circuit 156 may also or alternatively receive and inject fuel during high power turbine engine operation; e.g., during aircraft takeoff or high thrust maneuvers. Of course, in other embodiments, one or more or each of the fuel nozzles 80 may be configured without any additional fuel circuits.

Figure 11:
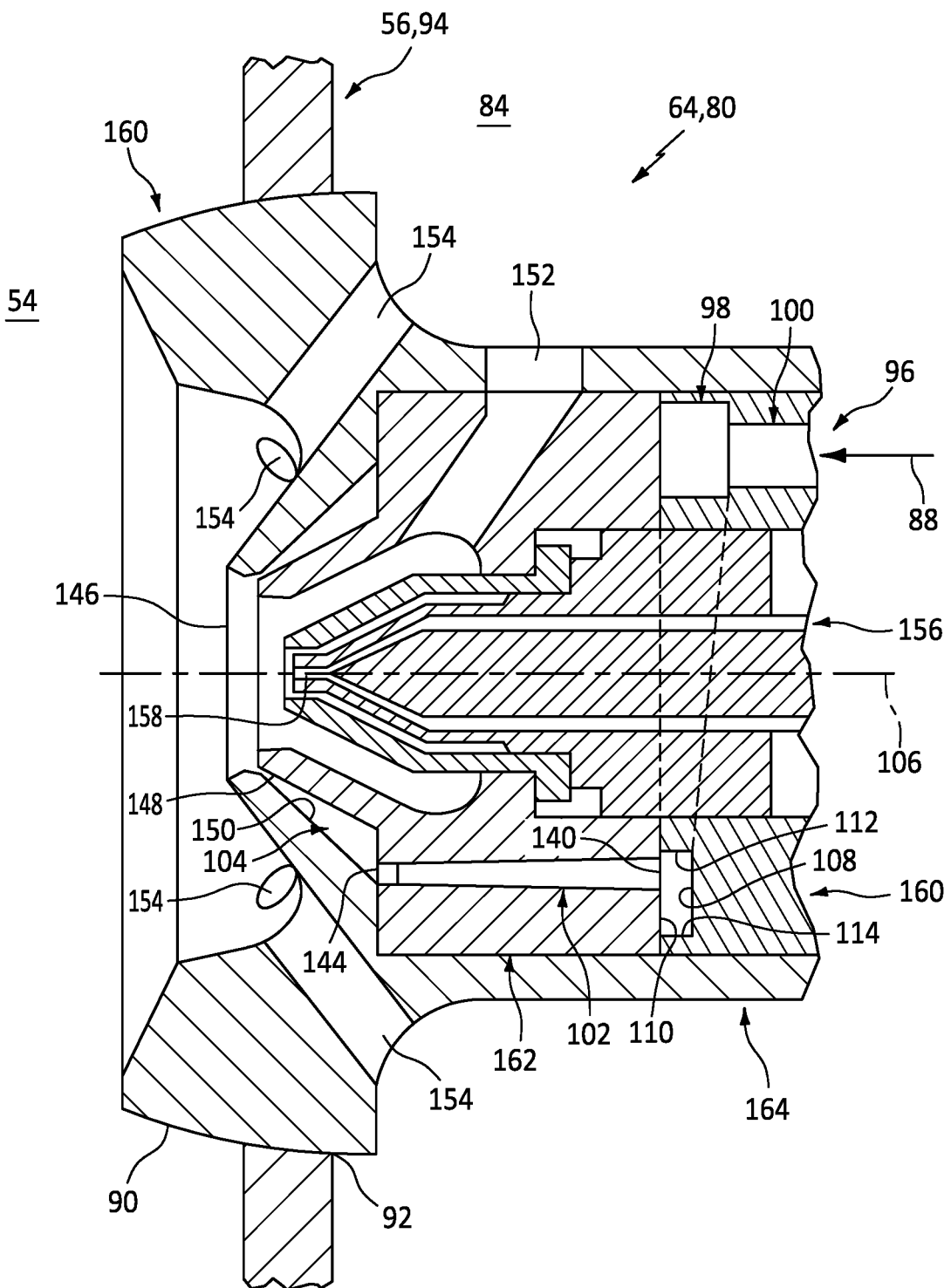
FIG. 11 is a side sectional illustration of a multi-segment fuel nozzle arranged with a portion of the combustor wall.

In some embodiments, referring to FIG. 4, each fuel nozzle 80 may be formed as a monolithic body 160. At least the fuel nozzle 80 or the entire fuel injector 64, for example, may be additively manufactured, metal injection molded (MIM), cast, machined and/or otherwise formed as a single, unitary body; e.g., from a single mass of metal. Alternatively, each of the fuel nozzles 80 may be formed from a plurality of discretely formed components which are subsequently assembly together (e.g., via mechanical attachment, bonding, etc.) to provide the respective fuel nozzle 80. For example, referring to FIG. 11, the fuel nozzle 80 may include at least a fuel nozzle body 160, a fuel nozzle insert 162 and a fuel nozzle head body 164. At least these fuel nozzle components 160, 162 and 164 may collectively form the fuel nozzle circuit 96 within the fuel nozzle 80. For example, at least the fuel nozzle body 160 may form the feed passage 100. The fuel nozzle body 160 and the fuel nozzle insert 162 may collectively form the fuel gallery 98 axially therebetween. The fuel nozzle body 160, for example, may form the inner side surface 112, the outer side surface 114 and the first side surface 108. The fuel nozzle insert 162 may form the second side surface 110. The fuel nozzle insert 162 may form the exit passages 102. The fuel nozzle insert 162 and the fuel nozzle head body 164 may collectively form the fuel film passage 104 therebetween. The fuel nozzle insert 162, for example, may form the film passage inner surface 148. The fuel nozzle head body 164 may form the film passage outer surface 150. The present disclosure, however, is not limited to the foregoing exemplary segmented (e.g., non-monolithic) fuel nozzle configuration.

The combustor 56 is described above as an annular combustor. However, in other embodiments, the fuel system 58 may be configured to deliver fuel to one or more non-annular combustors; e.g., CAN-type combustors.

The fuel system 58 and/or one or more of its fuel injectors 64 may be included in various turbine engines other than the one described above. The fuel system 58, for example, may be included in a geared turbine engine where a geartrain connects one or more shafts to one or more rotors in a fan section, a compressor section and/or any other engine section. Alternatively, the fuel system 58 may be included in a turbine engine configured without a geartrain; e.g., a direct drive turbine engine. The fuel system 58 may be included in a geared or non-geared turbine engine configured with a single spool, with two spools (e.g., see FIG. 1), or with more than two spools. The turbine engine may be configured as a turbofan engine, a turbojet engine, a propfan engine, a pusher fan engine, an auxiliary power unit (APU) or any other type of turbine engine. The present disclosure therefore is not limited to any particular types or configurations of turbine engines. In addition, while the turbine engine is described above for use in an aircraft application, the present disclosure is not limited to such aircraft applications. For example, the turbine engine may alternatively be configured as an industrial gas turbine engine, for example, for a land based power plant.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A fuel injector for a turbine engine, comprising:
a fuel nozzle including a feed passage, a first exit passage and a gallery;
the feed passage extending in the fuel nozzle to a feed passage location along the gallery;
the gallery extending in the fuel nozzle circumferentially about an axis from a first end of the gallery to a second end of the gallery and extending in the fuel nozzle axially from a first side surface to a second side surface; and
the first exit passage extending in the fuel nozzle to a first exit passage orifice in the second side surface at a first exit passage location along the gallery;
wherein a size of the gallery decreases at least radially and then increases at least radially as the gallery extends circumferentially about the axis away from the feed passage location and towards the first exit passage location, and the first side surface of the gallery has a spiral geometry.

2. The fuel injector of claim 1, wherein the size of the gallery comprises a cross-sectional area of the gallery.

3. The fuel injector of claim 1, wherein an axial height of the gallery decreases as the gallery extends circumferentially about the axis from the feed passage location to the first exit passage location.

4. The fuel injector of claim 1, wherein the size of the gallery at the feed passage location and the size of the gallery at the first exit passage location are each greater than the size of the gallery at an intermediate location circumferentially between the feed passage location and the first exit passage location along the gallery.

5. The fuel injector of claim 4, wherein the size of the gallery at the feed passage location is greater than the size of the gallery at the first exit passage location.

6. The fuel injector of claim 1, wherein
the fuel nozzle further includes a second exit passage that extends in the fuel nozzle to a second exit passage location along the gallery; and
the size of the gallery decreases and then increases as the gallery extends circumferentially about the axis away from the first exit passage location and towards the second exit passage location.

7. The fuel injector of claim 6, wherein
a first intermediate location is circumferentially between the feed passage location and the first exit passage location along the gallery;
a second intermediate location is circumferentially between the first exit passage location and the second exit passage location along the gallery; and
the size of the gallery at the first intermediate location is greater than the size of the gallery at the second intermediate location.

8. The fuel injector of claim 6, wherein
the size of the gallery at the feed passage location is greater than the size of the gallery at the first exit passage location; and
the size of the gallery at the first exit passage location is greater than the size of the gallery at the second exit passage location.

9. The fuel injector of claim 1, wherein
the gallery extends radially in the fuel nozzle from an inner side surface to an outer side surface; and
the inner side surface has a radially undulating geometry.

10. The fuel injector of claim 1, wherein
the gallery extends radially in the fuel nozzle from an inner side surface to an outer side surface; and
the outer side surface has an arcuate geometry with a uniform radius circumferentially about the axis.

11. The fuel injector of claim 1, wherein the feed passage extends to a feed passage orifice in the first side surface.

12. The fuel injector of claim 1, wherein
the second side surface has an arcuate planar geometry.

13. The fuel injector of claim 1, wherein
the gallery is formed by a channel, a first recess and a second recess;
the channel extends in the fuel nozzle circumferentially about the axis from the first end of the gallery to the second end of the gallery;
the first recess is arranged at the first end of the gallery, and the first recess projects radially into the fuel nozzle from the channel; and
the second recess is circumferentially spaced from the first recess, and the second recess projects radially into the fuel nozzle from the channel.

14. A fuel injector for a turbine engine, comprising:
a fuel nozzle including a feed passage, a plurality of exit passages and a gallery;
the feed passage extending in the fuel nozzle to the gallery;
the gallery extending in the fuel nozzle circumferentially about an axis from a first end of the gallery to a second end of the gallery and extending in the fuel nozzle axially from a first side surface to a second side surface; and
each of the plurality of exit passages extending to a respective exit passage orifice in the second side surface;
wherein a size of the gallery undulates such that the gallery radially decreases and then radially increases as the gallery extends circumferentially about the axis from the first end of the gallery to the second end of the gallery, and an axial height of the gallery uniformly or incrementally decreases as the gallery extends circumferentially about the axis from the first end of the gallery to the second end of the gallery.

15. A fuel injector for a turbine engine, comprising:

a fuel nozzle including a feed passage, a plurality of exit passages and a gallery;

the feed passage extending in the fuel nozzle to the gallery;

the gallery extending in the fuel nozzle circumferentially about an axis from a first end of the gallery to a second end of the gallery, the gallery extending in the fuel nozzle radially from an inner side surface to an outer side surface, and the gallery extending in the fuel nozzle axially from a first side surface to a second side surface; and a first exit passage of the plurality of exit passages extending in the fuel nozzle to the second side surface of the gallery;

wherein the inner side surface of the gallery has a radially undulating geometry between the feed passage and the first exit passage, and the outer side surface of the gallery has an arcuate geometry with a uniform radius circumferentially about the axis between the feed passage and the first exit passage, and the first side surface of the gallery has a spiral geometry.

*    *    *    *    *